United States Patent [19]

Hendricks et al.

[11] Patent Number: 4,701,284
[45] Date of Patent: Oct. 20, 1987

[54] BRANCHED SULFOSUCCINAMIC ACID EMULSIFIERS FOR THE PRODUCTION OF PARTICULARLY SHEAR-STABLE DESPERSIONS

[75] Inventors: Udo W. Hendricks, Odenthal; Adolf Schmidt, Cologne, both of Fed. Rep. of Germany

[73] Assignee: Bayer Aktiengesellschaft, Leverkusen, Fed. Rep. of Germany

[21] Appl. No.: 843,305

[22] Filed: Mar. 24, 1986

[30] Foreign Application Priority Data

Apr. 4, 1985 [DE] Fed. Rep. of Germany ....... 3512335

[51] Int. Cl.$^4$ .................... C07C 143/02; B01F 17/00
[52] U.S. Cl. ................. 260/513 N; 252/354
[58] Field of Search .................................. 260/513 N

[56] References Cited

U.S. PATENT DOCUMENTS 2,917,431 12/1959 Di Cicco .
4,076,744 2/1978 Kaplan et al. .
4,192,817 3/1980 Kaplan et al. ................. 260/513 N
4,462,808 7/1984 Gross et al. ................... 260/513 N
4,490,308 12/1984 Fong et al. .................... 260/513 N

FOREIGN PATENT DOCUMENTS 552758 6/1932 Fed. Rep. of Germany .
2137784 12/1972 France .
2091720 8/1982 United Kingdom .

*Primary Examiner*—Alan Siegel
*Attorney, Agent, or Firm*—Connolly & Hutz

[57] ABSTRACT

New sulfosuccinamic acids and derivatives thereof corresonding to the following formula

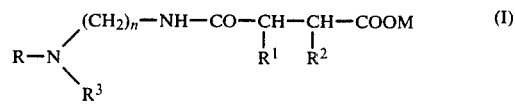

in which
R represents a linear or branches, saturated or unsaturated alkyl group containing from 8 to 22 carbon atoms or a group of the formula $R^4$—O—$(CH_2)_3$—($R^4 = C_8$-$C_{22}$ alkyl), $R^1$ and $R^2$ represent hydrogen or —$SO_3M^1$ and $R^3$ represents a group corresponding to the formula;

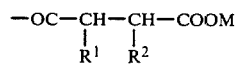

or to the forumla

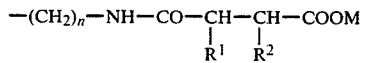

n is an integer of from 2 to 4 and M and $M^1$ independently of one another represent hydrogen or an alkali metal, an ammonium, $C_1$-$C_4$ alkylammonium or $C_2$-$C_3$ hydroxyalkylammonium group and their use as surfactants and emulsifiers in aqueous systems.

2 Claims, No Drawings

BRANCHED SULFOSUCCINAMIC ACID EMULSIFIERS FOR THE PRODUCTION OF PARTICULARLY SHEAR-STABLE DESPERSIONS

This invention relates to new sulfosuccinamic acids and derivatives thereof corresponding to the following formula.

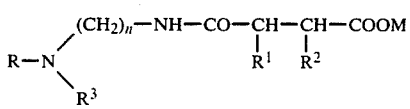

in which
R represents a linear or branched, saturated or unsaturated alkyl group containing from 8 to 22 carbon atoms or a group of the formula $R^4$—O—$(CH_2)_3$—($R^4 = C_8-C_{22}$ alkyl);
of the radicals
$R^1$ an $R^2$, one represents hydrogen and the other —$SO_3M^1$ and
$R^3$ represents a group corresponding to the formula

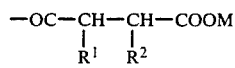

or to the formula

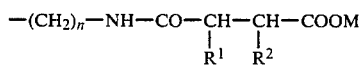

n is an integer of from 2 to 4 and M and $M^1$ independently of one another represent hydrogen or an alkali metal, an ammonium, $C_1-C_4$ alkylammonium or $C_2-C_3$ hydroxyalkylammonium group.

The invention also relates to the use of the compounds corresponding to the formula I as surfactants and emulsifiers in aqueous systems.

Examples of R are the 2-ethylhexyl, decyl, dodecyl, tetradecyl, hexadecyl, octadecyl, octadecenyl, dodecyloxypropyl and octadecyloxypropyl group.

Examples M and $M^1$ are sodium, potassium, ammonium, mono-, di- or trimethylammonium, mono-, di- or triethylammonium, mono-, di- or trihydroxyethylammonium and mono-or dihydroxypropylammonium.

The compounds of formula I may be obtained by methods known per se, for example by reacting polyamides corresponding to the following formula

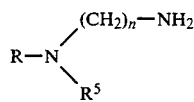

in which R and n are defined above and $R^5$ represents hydrogen or —$(CH_2)_n$—$NH_2$, with maleic acid anhydride, the molar ratio of the sum of primary and secondary amino groups to maleic acid anhydride being from 1:0.9 to 1:1.1 and preferably 1:1, and subsequently reacting the reaction products obtained with alkali or ammonium sulfites.

The quantity of alkali or ammonium sulfite used is selected in such a way that from 0.95 to 1.05 moles of alkali or ammonium sulfite are used per mole of maleic acid anhydride used. Amines corresponding to formula II, in which $R^5$ represents hydrogen, are described, for example, in J. Org. Chem., Vol. 15 (1950), pages 51 et seq. and J. Am. Chem. Soc., Vol 67 (1945), page 1581. Amines corresponding to formula II, in which $R^5$ represents —$(CH_2)_n$—$NH_2$, may be obtained in accordance with U.S. Pat. No. 3,028,415 and U.S. Pat. No. 3,615,797.

Most of the known and commercially available emulsifiers consist of a hydrophobic hydrocarbon or alkylaryl radical containing a hydrophilic group, for example a sulfonate, sulfate, carboxylate or phosphonate group. Units of ethylene oxide or propylene oxide may also be found through suitable reactive groups onto a hydrophobic radical, whereby surfactant properties are again obtained. Instead of one hydrophobic radical, two hydrophobic radicals may be attached to a hydrophilic group, as in the sulfosuccinic acid diesters. A list of various emulsifiers and their manufacturers can be found, for example, in Mc Cutcheon's Detergents and Emulsifiers 1971, 1972 and 1973 and also permanently in the journal Tenside Detergents.

Emulsifiers containing several hydrophilic groups on a hydrophobic radical are known and are described, for example, in U.S. Pat. Nos. 2,206,249, 2,438,092, and 2,435,810.

Of the emulsifiers containing several hydrophilic anionic groups, only the tetrasodium salt corresponding to the following formula

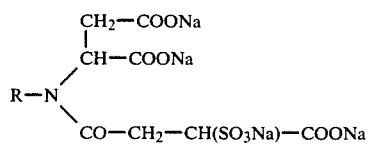

wherein R is defined as Octadecyl has acquired any real significance. This compound is said to be particularly suitable, for example, for the production of finely divided plastics dispersions (except for vinylacetate), in addition to which this emulsifier is said to be eminently suitable for improving the mechanical stability of the dispersions. It is also recommended for subsequent addition.

The new compounds corresponding to formula I are superior to the compound known per se corresponding to formula III in their apparently unique property of improving shear stability and, at the same time, show other advantages. Thus, it is known that the compound corresponding to formula III clouds in acidic media, particularly at elevated temperature, and because of this also presents difficulties in the polymerization of monomers of the type which are preferably polymerized at acidic pH values.

The new compounds corresponding to formula I show an excellent effect in improving the shear stability of plastics dispersions and are also effective in acidic medium.

In addition, finely divided dispersions of particularly low viscosity are obtained which, in addition, do not foam on demonomerization.

The compounds according to the invention show excellent solubility in water and have a good wetting power and a limited tendency towards foaming, particularly towards the formation of a stable fine-bubble foam. Although the compounds according to the invention have special properties suitable for emulsion polymerization, they may also be used for the production of printing and rawing inks, water colors, cleaning preparations of all kinds, for softening, fulling, mercerizing, preparation, as fabric softeners, for dyeing, for dry cleaning, as a spinning bath additive in viscose manufacture, for leather oils, for the cold fat-liquoring of leather, for dispersing lime soaps, as auxiliaries in the backing of carpets, for coating paper, for degreasing metal surfaces as auxiliaries in flotation and petroleum production, as additives for plant protection agents, in the photographic industry, for disinfection, as indirect building materials and in mining (cf. Technische Anwendung der grenzflächen-ahtiven Verbindungen in Chemische Taschenbücher No. 14, Verlag Chemie Weinheim, authos H. Bueren and H. Großmann, 1971).

In principle, any technically important monomers which are known to be suitable for emulsion polymerization may be polymerized in the presence of the compounds according to the invention in the mildly acidic to alkaline pH range. The following monomers are particularly mentioned: ethylene, 1,3-butadiene, isoprene, chloroprene, styrene, subsituted styrenes, such as 1-methylstyrene (in combination with other monomers), vinylchloride, vinylidene chloride, vinylacetate, vinylpropionate, vinylversatic ester, vinylisobutylether, acrylonitrile, methacrylonitrile, methylacrylate, ethylacrylate, n-butylacrylate, 2-ethylhexylacrylate, methylmethacrylate, ethylmethacrylate, n-butylmethacrylate and mixtures thereof which may be assessed according to known copolymerization parameters. The glass transition temperatures of such producible copolymers may be calculated again from known equations. Plastics dispersions obtained may be film-forming or nonfilm-forming. In addition, acrylic acid, methacrylic acid, acrylamide, methacrylamide and vinyl monomers containing additional functional groups may be copolymerized in known manner. Monomers such as these are listed, for example, in F. Hölscher "Dispersionen synthetischer Hochpolymerer", Part I, Springer Verlag Berlin Heidelberg, page 56.

Since the compounds according to the invention provide the plastics dispersions prepared with them with excellent stability, they are also recommended as additives for the dispersion of various pigments in plastics dispersions. Thus, they may also be widely used in paint binders, paper binders, leather binders, textile binders and more especially and preferably in fabric printing binders. It is also possible to provide dispersions prepared with standard anionic or nonionic emulsifiers with excellent shear stability by subsequent addition of the emulsifiers according to the invention.

The polymerization in the presence of the compounds according to the invention may be carried out by methods known per se in batches, semi-continuously or fully continuously. In principle, seed latices may also be used.

The compounds according to the invention used in quantities of from 0.5 to at most 8%, based on monomer, lead to relatively finely divided suspensions or rather dispersions. Thus, it is possible to prepare dispersions having mean particle diameters of from about 25 nm to 500 nm using standard polymerization techniques. In the case of finely divided butadiene homopolymer and copolymer dispersions, low viscosities were observed, for example, even at solids contents of higher than 40%. The compounds according to the invention may be used with particular advantage for preparing the finely divided components of bimodal systems of the type which have recently been used to an increasing extent in the production of pigmented, highly filled spread-coating composition. In this case, the finely divided latices may be prepared with the compounds according to the invention and subsequently mixed with coarser latices of which the particle diameter is larger by a factor of from 1.5 to 4.

However, a latex may also be polymerized to large average particles diameters, the critical micelle concentration subsequently reached by addition of a compound according to the invention and new particles formed thereafter, so that bimodal systems may be formed in a one-shot process.

By virtue of their multifunctional hydrophilic groups, the emulsifiers according to the invention may be co-condensed with combinations which react, for example, with carboxyl groups. In that case, it is best to use the ammonium salts of the emulsifiers according to the invention instead of the sodium or potassium salts. The average latex-particle diameter in the following examples was determined by turbidimetric methods. The specific turbidity K was measured and $\bar{d}$ was obtained from a diagram K-$\bar{d}$. $\bar{d}$ means DAN (see DIN 53 206).

EXAMPLE 1

121 parts of N-dodecylpropanediyl diamine were dissolved in 80 parts of toluene and 98 parts of maleic acid anhydride added at 50° to 60° C. After stirring for 30 minutes at a temperature of 50° to 60° C., the toluene was distilled off under reduced pressure at 50° to 60° C. 221 parts of the crude N-dodecyl-N,N'-propanediyl bis-maleamic acid

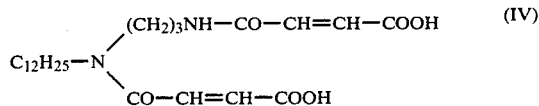

were obtained.

Acid number: calculated: 255.7, found: 253.

100 parts of isopropanol and a solution of 120 parts of sodium sulfite in 400 parts of water were added to 210 parts of the product described above, followed by stirring at 80° to 90° C. until the titrimetic concentration of sulfite had fallen below 0.02%.

830 parts of a clear, viscous aqueous solution of the sulfosuccinamic acid corresponding to the following formula were obtained:

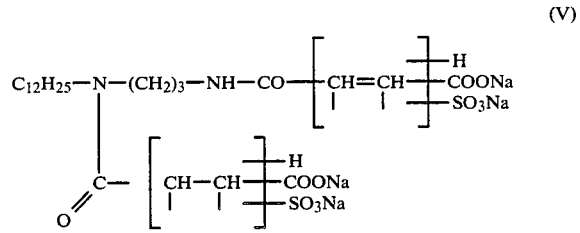

EXAMPLE 2

98 parts of maleic acid anhydride were dissolved in 120 ml of toluene at 50° to 60° C. and 163 parts of a technical tallow propylene diamine (amine equivalent 162) added to the resulting solution at the same temperature. After stirring for 30 minutes at 50°–60° C., the toluene was distilled off under reduced pressure, leaving as residue 261 parts of crude N-tallow alkyl-N,N'- propanediyl bismaleamic acid corresponding to the following formula

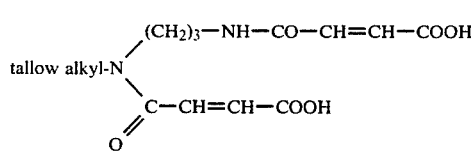
(VI)

Acid number: calculated 214.6, found 220.

140 parts of isopropanol and a solution of 126 parts of sodium sulfite in 550 parts of water were added to the product obtained, followed by stirring for 4 hours at 80° to 90° C. Thereafter, the sulfite concentration amounted to 0.004%.

1077 parts of a clear, viscous aqueous solution of the sulfosuccinamic acid corresponding to the following formula

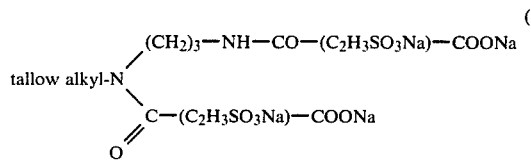
(VII)

were obtained.

The sulfosuccinamic acid corresponding to the following formula

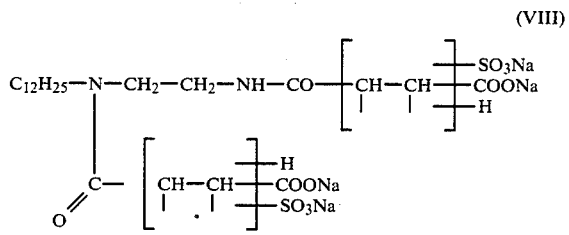
(VIII)

is similarly obtained from N-dodecylethylene diamine by reaction with maleic acid anhydride and sodium sulfite.

EXAMPLE 3

53 parts of maleic acid anhydride were dissolved in toluene and a solution of 100 parts of N-(3-aminopropyl)-N-octadecyl-1,3-propanediyl diamine added to the resulting solution at 40° to 50° C. After stirring for 2 hours at 40° to 50° C., the toluene was distilled off under reduced pressure, leaving as residue 152 parts of the crude bismaleamic acid corresponding to the following formula

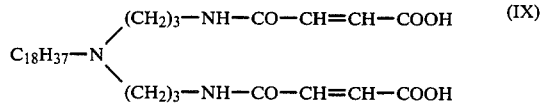
(IX)

Acid number: calculated 193, found 203.
Base-N: calculated at 2.4%, found 2.5%.

145 parts of the crude bis-maleamic acid were stirred for 6 hous at 80°–90° C. with 190 parts of isopropanol and a solution of 64 parts of sodium sulfite in 250 parts of water until the sulfite concentration had fallen below 0.1%. A clear, viscous aqueous solution of the sulfosuccinamic acid corresponding to the following formula was obtained:

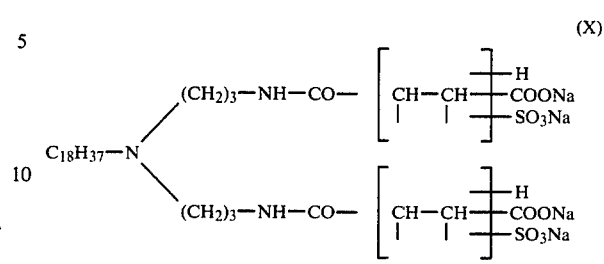
(X)

EXAMPLE 4

The following components were introduced in the absence of air into a 40 liter fine-steel autoclave equipped with a paddle stirrer, pressure and temperature recorder and a pH meter:

| Deionized water | 14 170 g |
|---|---|
| Emulsifier, prepared in accordance with Example 1 in the form of a 10% aqueous solution | 3 813 g |
| Tert.-dodecylmercaptan | 40 g |
| Potassium peroxodisulfate solution, 2.5% in water | 1 196 g |
| Butadiene | 12 788 g |

All the components apart from the potassium persulfate solution are initially introduced, the mixtur is heated to 60° C. and the potassium persulfate solution is then added all at once. The temperature (internal) is electronically controlled and is maintained to an accuracy of approx. 1 degree. After 6 hours, the temperature is increased to 62° C., after 12 hours from 62° C. to 65° C. and after 17 hours from 65° C. to 68° C.

Evaporation samples are taken at hourly intervals, the solids content of the latex is determined. Its surface tension is measured, its pH value is determined and its particle size measured.

The following values are obtained (cf. Table I)

| Time (hrs) | Solids % b.w. | pH-value electr. | Surface Tension dyn/cm (stalagmometer) | Average particle diameter (nm) turbidimetrically. |
|---|---|---|---|---|
| 1 | 3.6 | 5.8 | 46.3 | 30 |
| 3 | 5.8 | 5.5 | 51.8 | 63 |
| 5 | 8.6 | 5.9 | 59.9 | 78 |
| 9 | 19.2 | 6.3 | 65.2 | 79 |
| 13 | 32.7 | 6.5 | 66.2 | 84 |
| 18 | 40.3 | 6.85 | 66.5 | 90 |

After polymerization, there is no coagulate in the reactor. The latex may readily be free from residual monomers without any foaming. The latex is thinly liquid and is completely free from specks and microcoagulate.

EXAMPLE 5

The following constituents were introduced in the absence air into a 6 liter fine-steel autoclave equipped with a paddle stirrer, pressure and temperature recorder and pH-meter:

| Deionized water | 2 032 g |
|---|---|

| | -continued | |
|---|---|---|
| Emulsifier, prepared in accordance with Example 3 in the form of a 10% aqueous solution | 546.6 g | |
| Tert.-dodecylmercaptan | 5.7 g | |
| Potassium peroxodisulfate solution, 2.5% in water | 59.5 g | |
| Potassium peroxodisulfate solution, 2.5% in water | 112 g | |
| Butadiene | 1 823 g | |

All components apart from the activator solutions are initially introduced and the mixture is heated to 60° C. at 150 r.p.m. When the temperature of 60° C. is reached, the first activator solution (59.5 g) is introduced into the autoclave, the second activator solution being introduced over a period of 14 hours. Samples are taken at hourly intervals. The course of the polymerization process is shown in the following Table:

| Time hrs | Temp. °C. | Pressure bar | Solids content % | Particle diameter (nm) |
|---|---|---|---|---|
| 1 | 60 | 7.8 | 4 | 25 |
| 2 | 60 | 7.6 | 5.2 | — |
| 3 | 60 | 7.3 | 8.0 | — |
| 4 | 60 | 6.8 | 8.7 | — |
| 5 | 60 | 6.8 | 10.5 | — |
| 6 | 60 | 6.5 | 13.0 | — |
| 7 | 62 | 6.9 | 15.1 | — |
| 8 | 62 | 6.8 | 22.0 | — |
| 9 | 63 | 6.8 | 28.4 | 47 |
| 10 | 64 | 6.5 | 30.7 | — |
| 11 | 68 | 6.8 | 33.9 | 72 |
| 12 | 68 | 4.5 | 35.8 | — |
| 13 | 68 | 3.5 | 38.0 | — |
| 14 | 68 | 2.5 | 38.5 | — |
| 15 | 68 | 1.8 | 39.0 | — |
| 16 | 68 | 1.2 | 39.5 | 73 |
| 17 | 68 | 0.7 | 39.7 | — |

No coagulate was formed during the polymerization process and the latex was free from specks and microcoagulate. The latex did not foam during demonomerization and the flowout time of the demonomerized latex from the orifice cup according to DIN 53 211 (100 cm dispersion, 20° C., 4 mm orifice) was approximately 30 seconds for a solids content of approx. 41%.

EXAMPLE 6

The demonomerized polybutadiene latices prepared in accordance with Example 4 and 5 cannot be rubbed into coagulae balls between the fingertips simply by shearing. Shear stability was more accurately assessed by the following procedure:

500 g of latex were adjusted to pH 10 by addition of aqueous ammonia ($NH_3$) solution. The latex was then diluted to a solids content of 35% by weight.

80 g of this 35% latex were introduced into a 21 cm tall cylindrical metal beaker (internal diameter 6 cm) provided externally with a cooling jacket. The metal beaker was embedded in a 13 cm wide, 13 cm long and 5 cm deep fine steel block with a cylindrical recess and fixed therein by knurled-head screws. Arranged in uniform distribution inside the metal beaker were 4 mm wide splashboards which extended from the bottom to beyond the rim of the metal beaker and which were fixed to the walls thereof by clamping rings, extending at right angles to the surface of those walls.

A stirring element consisting of a single disc 2 mm thick and 2 cm in diameter dipped into the latex inside the beaker. The disc was mounted on an approximately 8 cm long shaft which, from approx. 5 mm near the disc, thickened in the upward direction and which was driven by a high-speed motor. The apparatus was equipped with an accurate revolution counter and the rotational speed could be adjusted exactly to a specific value, in this case 20,000 r.p.m. After a period predetermined by an electronic stopwatch, in this case exactly 20 minutes, the motor was switched off. The apparatus as a whole was acomodated in a sound-insulated box. After this shear stressing, the contents of the metal beaker were filtered through a narrow-mesh fine-steel sieve (square mesh width 50 micrometers), the coagulate remaining in the sieve was dried to constant weight and then reweighed.

In the case of the two alkalized latices, hardly any coagulate (approx. 0.01 g) remained behind after this procedure. Accordingly, these latices are extremely shearstable. When the pH value was reduced, for example by addition of acetic acid, the stability of the dispersions decrease considerably, becoming comparable with the usual emulsifiers in the mildly acidic pH range.

The above-mentioned latices may be agglomerated by additions of polyvalent metal ions. They may also be agglomerated by mechanical shear stressing in the neutral to mildly acidified state.

EXAMPLE 7

This Example is intended to show that additions of the emulsifiers according to the invention to a dispersion prepared with anionic emulsifiers known per se considerably improve their shear stability. It is also known that corresponding additions of anionic surfactants know per se do not produce a comparable effect.

The model substance used was a 41% demonomerized polybuadiene latex having an average particle diameter of 110 nm. The latex was prepared by a semicontinuous feed process at 50° C. using in all 1.8% by weight of an emulsifier mixture consisting of equal parts of potassium oleate and sodium lauryl sulfate, a redox system of a water-in-soluble organic peroxide (p-methanehydroperoxide), a water-soluble reducing agent (sodium formaldehyde sulfoxylate) and Fe(II) complexonate solution being used as the initiator system.

85 g of this latex were weighed into a glass beaker, a solution of an emulsifier X in water (5% by weight), as specified in the following Table, was added with stirring, a pH value of 10 was adjusted with 5% by weight ammonia solution and the mixture made up with water to 100 g. The mixture was then stirred slowly for about another 30 minutes.

The stirring stability was determined by the method described in Example 6, 80 g of the approx. 35% latices being mechanically stressed for 20 minutes at 20,000 r.p.m. at a constant temperature of 25° C. in the apparatus described in Example 6.

To enable the effectiveness of the various emulsifier additives to be compared,
(a) a smaller quantity ($2.22 \times 10^{-4}$ moles of emulsifier X/100 g of polymer),
(b) a larger quantity ($8.57 \times 10^{-3}$ moles of emulsifier X/100 g of polymer)
were added to the test latex before dilution. The effect of the smaller (a) and larger (b) additions is shown in the following Table.

| | a % coagulate | b % coagulate |
|---|---|---|
| Paraffin sulfonate mixture, average chain length $C_{14}$ | 4.05 | 3.44 |
| Sulfosuccinic acid dioctylester | 3.49 | 1.16 |
| Potassium laurate | 3.39 | 1.42 |
| Potassium oleate | 3.69 | 1.13 |
| $C_{12}$-$C_{14}$ alkylbenzene sulfonate, Na—salts | 3.15 | 1.21 |
| $C_{12}H_{25}$—N—CH—COONa<br>  \|       \|<br>         CH—COONa<br>         CO—CH$_2$—CH$_2$—COONa | 3.49 | 1.01 |
|        CH—COONa<br>       \|<br>R—N—CH—COONa<br>   \|<br>   CO—CH$_2$—CH(SO$_3$Na)—COONa<br>(R = $C_{18}$)<br>(comparison) | 1.95 | 0.18 |
| Emulsifier of Example 1 (according to the invention) formula V | 1.71 | 0.14 |
| Emulsifier of Example 2 (according to the invention) formula VII | 1.40 | 0.12 |
| Emulsifier of Example 3 (according to the invention) formula X | 1.65 | 0.08 |

We claim:

1. Sulfosuccinamic acids and derivatives thereof corresponding to the following formula $$R-N\begin{matrix}(CH_2)_n-NH-CO-CH-CH-COOM \\ \phantom{(CH_2)_n-NH-CO-}| \phantom{-}| \\ \phantom{(CH_2)_n-NH-CO-}R^1 \phantom{-}R^2 \\ R^3\end{matrix} \quad (I)$$

in which

R represents a linear or branched, saturated or unsaturated alkyl group containing from 8 to 22 carbon atoms or a group of the formula $R^4$—O—(CH$_2$)$_3$—, ($R^4$=$C_8$-$C_2$ alkyl);

of the radicals $R^1$ and $R^2$, one represents hydrogen and the other —SO$_3M^1$ and $R^3$ represents a group corresponding to the formula $$-OC-CH-CH-COOM$$
$$\phantom{-OC-}|\phantom{-}|$$
$$\phantom{-OC-}R^1\phantom{-}R^2$$

or to the formula $$-(CH_2)_n-NH-CO-CH-CH-COOM$$
$$\phantom{-(CH_2)_n-NH-CO-}|\phantom{-}|$$
$$\phantom{-(CH_2)_n-NH-CO-}R^1\phantom{-}R^2$$

n is an integer of from 2 to 4 and M and $M^1$ independently of one another represent hydrogen or an alkali metal, an ammonium, $C_1$-$C_4$ alkylammonium or $C_2$-$C_3$ hydroxyalklammonium group.

2. Sulfosuccinamic acids and derivatives thereof according to claim 1 wherein

R is 2-ethylhexyl-, decyl-, dodecyl-, tetradecyl-, hexadecyl-, octadecyl-, dodecyloxypropyl- or octadecyl-oxypropyl.

* * * * *